US008799749B2

(12) United States Patent
Kwak et al.

(10) Patent No.: US 8,799,749 B2
(45) Date of Patent: Aug. 5, 2014

(54) AD-HOC MULTIMEDIA GROUP COMMUNICATION TERMINAL ROBUST TO PACKET LOSS AND METHOD OF OPERATING THE SAME

(75) Inventors: Ji-Young Kwak, Gwangju (KR); Seon-Tae Kim, Daejeon (KR); Mi-Sun Yu, Daejeon (KR); Pyeong-Soo Mah, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 112 days.

(21) Appl. No.: 13/290,584

(22) Filed: Nov. 7, 2011

(65) Prior Publication Data

US 2012/0124443 A1    May 17, 2012

(30) Foreign Application Priority Data

Nov. 12, 2010    (KR) .................. 10-2010-0112561

(51) Int. Cl.
*H03M 13/00*    (2006.01)
*H04W 4/20*    (2009.01)
*H04L 29/06*    (2006.01)
*H04L 29/14*    (2006.01)
*H04L 1/00*    (2006.01)

(52) U.S. Cl.
CPC .................. *H04L 1/007* (2013.01); *H04W 4/20* (2013.01); *H04L 65/80* (2013.01); *H04L 65/602* (2013.01); *H04L 69/40* (2013.01)
USPC .......................................... 714/776; 714/746

(58) Field of Classification Search
USPC ................................................. 714/746, 776
See application file for complete search history.

(56) References Cited

U.S. PATENT DOCUMENTS 6,289,054 B1 *    9/2001    Rhee ..................... 375/240.27
6,317,462 B1 *    11/2001    Boyce .................... 375/240.27
(Continued)

FOREIGN PATENT DOCUMENTS

| JP | 2009-27690 | 2/2009 |
|----|----|----|
| KR | 10-2002-0033089 | 5/2002 |
| KR | 10-2004-0050810 | 6/2004 |
| KR | 10-2006-0125263 | 12/2006 |

OTHER PUBLICATIONS

Etoh, M.; Yoshimura, T., "Advances in Wireless Video Delivery," Proceedings of the IEEE, vol. 93, No. 1, pp. 111,122, Jan. 2005.*

(Continued)

*Primary Examiner* — Cynthia Britt
(74) *Attorney, Agent, or Firm* — Staas & Halsey LLP (57) ABSTRACT

Disclosed herein is an ad-hoc multimedia group communication terminal which is robust to packet loss and includes a multimedia transmitter. The media transmitter includes a reception status monitoring module, an error recovery level/traffic adjustment module, a bit stream division and error recovery data generation module, and a media data packet generation module. The reception status monitoring module recognizes packet reception status information relevant to the reception side terminals based on control packets from each of the reception side terminals. The error recovery level/traffic adjustment module adjusts the error recovery level and the amount of traffic of the media data packets. The bit stream division and error recovery data generation module generates error recovery data to be transmitted to the reception side terminals based on the error recovery level. The media data packet generation module generates the media data packets and error recovery data packets.

13 Claims, 8 Drawing Sheets

(56) References Cited

U.S. PATENT DOCUMENTS

| | | | |
|---|---|---|---|
| 6,542,490 B1* | 4/2003 | Ahmadvand et al. | 370/338 |
| 7,068,619 B2* | 6/2006 | Balachandran et al. | 370/328 |
| 7,451,344 B1* | 11/2008 | Rothberg | 714/6.1 |
| 7,681,101 B2* | 3/2010 | Oran et al. | 714/748 |
| 8,358,704 B2* | 1/2013 | Shi et al. | 375/240.27 |
| 2003/0126238 A1* | 7/2003 | Kohno et al. | 709/220 |
| 2006/0005106 A1* | 1/2006 | Lane et al. | 714/758 |
| 2006/0291475 A1* | 12/2006 | Cohen | 370/395.42 |
| 2008/0235553 A1* | 9/2008 | Chintada et al. | 714/749 |
| 2008/0254749 A1 | 10/2008 | Ashkenazi et al. | |
| 2009/0193314 A1* | 7/2009 | Melliar-Smith et al. | 714/755 |
| 2011/0083032 A1* | 4/2011 | Marin et al. | 714/2 |
| 2012/0069135 A1* | 3/2012 | Cipolli et al. | 348/14.08 |
| 2013/0034007 A1* | 2/2013 | Zhang et al. | 370/252 |
| 2013/0070583 A1* | 3/2013 | Xu et al. | 370/216 |

OTHER PUBLICATIONS

EunGi Kim; Sunshin An, "High-level error control mechanisms for multimedia transport protocol," Communications, 1994. ICC '94, SUPERCOMM/ICC '94, Conference Record, 'Serving Humanity Through Communications.' IEEE International Conference on , vol., no., pp. 1336,1340 vol. 3, May 1-5, 1994.*

Hong HeatherYu; Peng Yin; XiaolongYu, "Joint content authentication and error control for wireless multimedia communications," Consumer Communications and Networking Conference, 2004. CCNC 2004. First IEEE , vol., no., pp. 412,417, Jan. 5-8, 2004.*

Masala, E.; Servetti,Antonio; De Martin, J.C., "Standard Compatible Error Correction for Multimedia Transmissions Over 802.11 WLAN," Multimedia and Expo, 2005. ICME 2005. IEEE International Conference on , vol., no., pp. 880,883, Jul. 6, 2005.*

* cited by examiner

AD-HOC MULTIMEDIA GROUP COMMUNICATION TERMINAL ROBUST TO PACKET LOSS AND METHOD OF OPERATING THE SAME

CROSS REFERENCE TO RELATED APPLICATION

This application claims the benefit of Korean Patent Application No. 10-2010-0112561, filed on Nov. 12, 2010, which is hereby incorporated by reference in its entirety into this application.

BACKGROUND OF THE INVENTION

1. Technical Field

The present invention relates generally to an ad-hoc multimedia group communication terminal which is robust to packet loss and a method of operating the same, and, more particularly, to an ad-hoc multimedia group communication terminal which is adaptive to wireless channel variations and robust to packet loss and a method of operating the same provided as a plan which enables media data to be successfully transmitted in a wireless ad-hoc network environment in which a large amount of packet loss and variations in transmission delay are generated due to a channel fading phenomenon and channel noise.

2. Description of the Related Art

Recently, with the rapid developments in wireless network technology and at the requests of users for various types of media service, research into and the development of media transmission via a wireless network have been actively moving forward. In particular, media streaming should be able to transmit each packet within a predetermined delay time while overcoming variations in a network.

However, media streaming in a wireless network has the problems of packet transmission delay, packet loss, and variations in bandwidth attributable to the characteristics of channels and the performance of mobile terminals. Most of all, wireless channel fading phenomenon and channel noise cause a large amount of channel errors. In order to overcome such a problem, a transmission error control, such as Automatic Repeat reQuest (ARQ), is performed on a link layer in a typical wireless network.

However, all the errors cannot be overcome using the above-described methods, and the frequent movement of nodes and signal interference cause packet loss and variations in transmission delay, thereby generating a rapid deterioration in the picture quality of streaming media.

Therefore, in order to successfully transmit media in a wireless ad-hoc network environment where there are severe channel variations, a transmission technology and an error control technology which are fluid in an application layer level and adaptive to a network are required.

An error recovery method of retransmitting one or more lost packets in a wireless ad-hoc network environment, in which nodes frequently move and signal interference is frequently performed, is effective from the point of view of reliability. However, the error recovery method causes considerable delay which cannot be estimated and the error recovery method is not appropriate for multimedia application services which have strict real-time restrictions.

SUMMARY OF THE INVENTION

Accordingly, the present invention has been made keeping in mind the above problems occurring in the prior art, and an object of the present invention is to provide an ad-hoc multimedia group communication terminal which is robust to packet loss and a method of operating the same, which can recover errors without performing retransmission in order to transmit media data in real time in a wireless ad-hoc network environment.

In order to accomplish the above object, an ad-hoc multimedia group communication terminal which is robust to packet loss according to the present invention includes a multimedia transmitter. The media transmitter includes: a reception status monitoring module for, when one or more media data packets are transmitted to one or more reception side terminals, recognizing packet reception status information relevant to the reception side terminals for each communication group based on one or more control packets received from each of the reception side terminals; an error recovery level/traffic adjustment module for, when it is determined that a large amount of packet loss occurred using the reception status monitoring module, adjusting an error recovery level and the amount of traffic of each of the media data packets transmitted to each of the reception side terminals based on the packet reception status information; a bit stream division and error recovery data generation module for generating error recovery data to be transmitted to each of the reception side terminals based on the error recovery level; and a media data packet generation module for generating the media data packets and error recovery data packets.

The error recovery level/traffic adjustment module may elevate the error recovery level of each of the media data packets in an order of a higher priority.

The error recovery level/traffic adjustment module may lower the amount of traffic of each of the media data packets by as much as the amount of error recovery traffic added when the error recovery level is elevated.

The bit stream division and error recovery data generation module may generate the error recovery data for respective video frames of video data in order to recover one or more lost packets of the video data.

The bit stream division and error recovery data generation module may generate mutually-related error recovery data of frame data, which requires one or more reference frames, from among the video frames of video data in order to recover one or more lost packets of the video data.

The bit stream division and error recovery data generation module may generate the error recovery data in which previous low-quality audio data is added in a redundant manner in order to recover one or more lost packets of audio data.

The bit stream division and error recovery data generation module may generate the error recovery data for audio packets corresponding to the delay tolerance interval of continuous packets in order to recover one or more lost packets of audio data.

Meanwhile, in order to accomplish the above object, an ad-hoc multimedia group communication terminal which is robust to packet loss according to the present invention includes a multimedia receiver. The multimedia receiver includes: a media data packet reception module for receiving one or more media data packets and one or more error recovery data packets from each of transmission side terminals using a sub protocol; a packet sequence and loss check module for, when the media data packets are received using the media data packet reception module, checking a packet loss rate based on whether all the media data packets are received from the transmission side terminal in regular order; a control packet generation module for generating one or more control packets, each including network Quality of Service (QoS) information relevant to transmission and reception side terminals based on the packet loss rate checked using the packet sequence and loss check module; and a bit stream reconstruction and error recovery module for receiving the error recovery data packets generated using the transmission side terminal and recovering the lost media data packets based on the control packets.

Meanwhile, in order to accomplish the above object, a method of operating an ad-hoc multimedia group communication terminal which is robust to packet loss and includes a multimedia transmitter according to the present invention enables the multimedia transmitter to perform the following: when one or more media data packets are transmitted to one or more reception side terminals, recognizing packet reception status information relevant to the reception side terminals for each communication group based on one or more control packets received from each of the reception side terminals; when it is determined that a large amount of packet loss occurred in the recognizing the packet reception status information, adjusting an error recovery level and the amount of traffic of each of the media data packets transmitted to each of the reception side terminals based on the packet reception status information; generating error recovery data to be transmitted to each of the reception side terminals based on the error recovery level; and generating the media data packets and error recovery data packets and then transmitting the generated media data packets and error recovery data packets to each of the reception side terminals using a sub protocol.

The adjusting may include elevating the error recovery level of each of the media data packets in an order of a higher priority.

The adjusting may include lowering the amount of traffic of each of the media data packets by as much as the amount of error recovery traffic added when the error recovery level is elevated.

The generating the error recovery data may include generating the error recovery data for respective video frames of video data in order to recover one or more lost packets of the video data.

The generating the error recovery data may include generating mutually-related error recovery data of frame data, which requires one or more reference frames, from among video frames of video data in order to recover one or more lost packets of the video data.

The generating the error recovery data may include generating the error recovery data in which previous low-quality audio data is added in a redundant manner in order to recover one or more lost packets of audio data.

The generating the error recovery data may include generating the error recovery data for audio packets corresponding to a delay tolerance interval of continuous packets in order to recover one or more lost packets of audio data.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Embodiment of the present invention will be described with reference to the accompanying drawings below.

Figure 1:
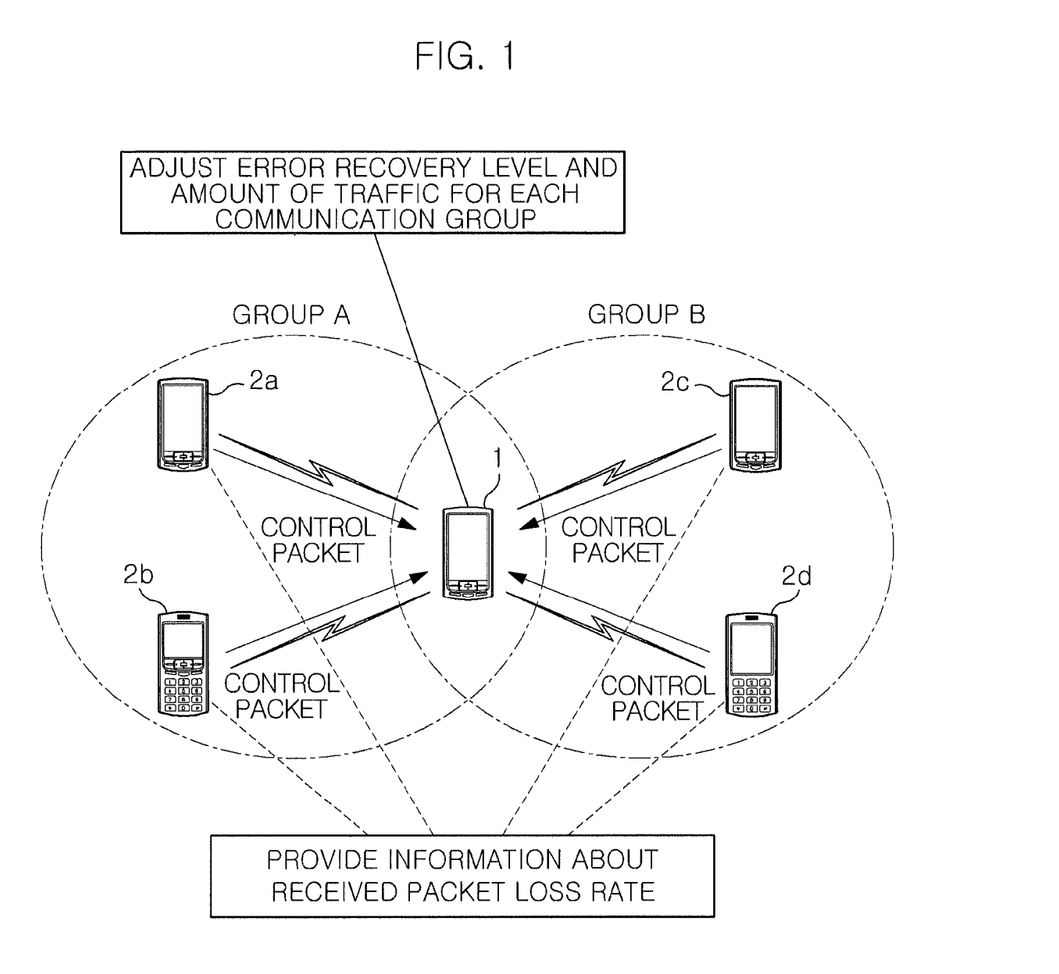
FIGS. 1 and 2 are views illustrating the configuration of a system to which ad-hoc multimedia group communication terminals which are robust to packet loss according to the present invention are applied.
Figure 2:
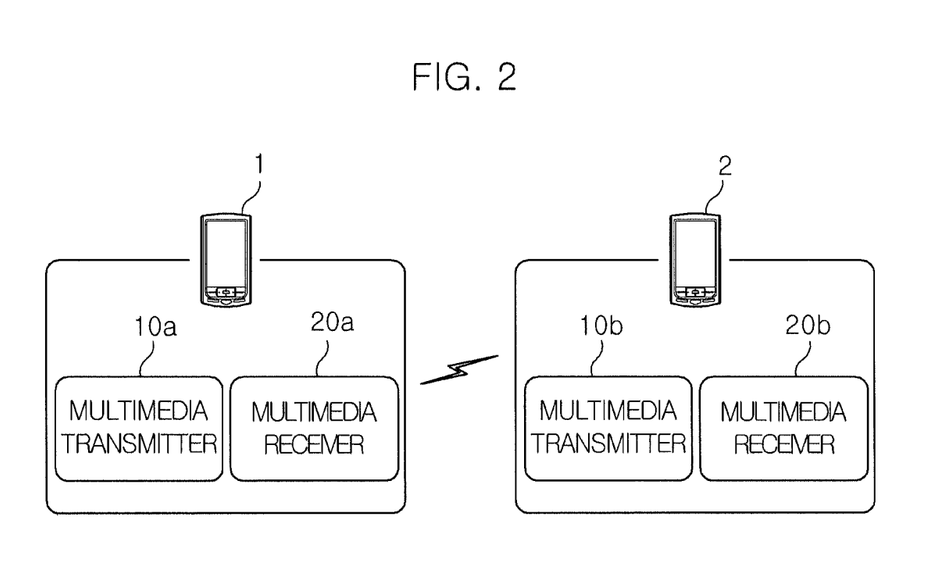

FIGS. 1 and 2 are views illustrating the configuration of a system to which ad-hoc multimedia group communication terminals which are robust to packet loss according to the present invention are applied. In detail, FIGS. 1 and 2 are views illustrating the concept of error recovery and traffic control which are adaptive to a network used for ad-hoc-based multimedia group communication.

In a wireless ad-hoc network environment applied to the present invention, there is a large amount of packet loss and transmission delay variation resulting from channel fading phenomenon, channel noise and frequent movement of nodes, so that the picture quality of streaming media is rapidly deteriorated.

Therefore, the present invention shown in FIG. 1 applies an error recovery method which is fluid and adaptive to a network in order to successfully transmit multimedia in a wireless ad-hoc network environment in which channel variations are severe.

Accordingly, a group communication transmission side terminal 1 receives network Quality of Service (QoS) information relevant to packets received from reception side terminals 2a, 2b, 2c, and 2d using one or more feedback control packets, determines the current network status on a transmission path between the transmission side terminal 1 and each of the reception side terminals 2a, 2b, 2c, and 2d based on the network QoS information, and controls an error recovery level and QoS and the amount of traffic of media data to be transmitted based on the status of the determination.

As shown in FIG. 2, each of the transmission side terminal 1 and the reception side terminal 2 includes a multimedia transmitter 10a or 10b and a multimedia receiver 20a or 20b.

The configuration of the multimedia transmitter and the multimedia receiver, which are applied to each of the transmission side terminal 1 and the reception side terminals 2a, 2b, 2c, and 2d shown in FIG. 2, will be described in detail with reference to FIG. 3.

Figure 3:
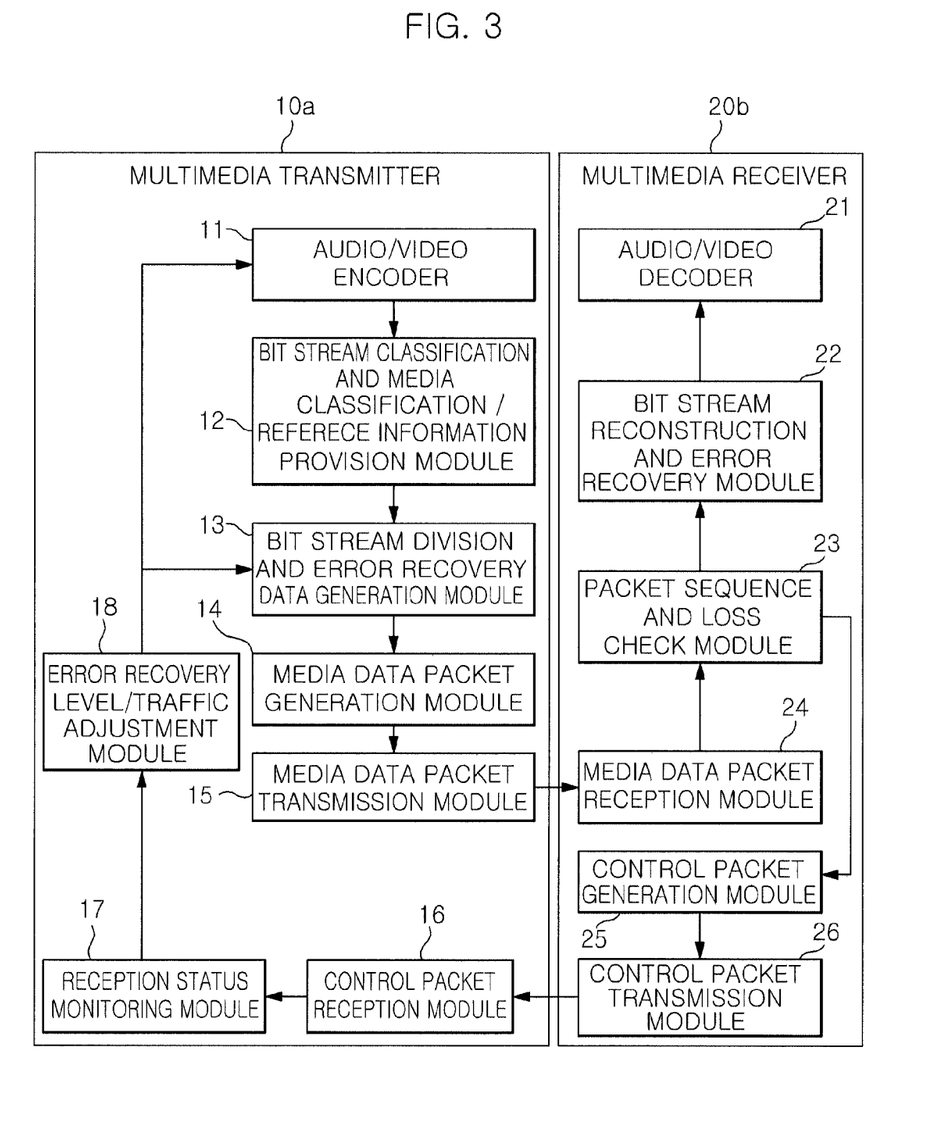
FIG. 3 is a block diagram illustrating the configuration of the multimedia transmitter and the multimedia receiver of an ad-hoc multimedia group communication terminal which is robust to packet loss according to the present invention.

FIG. 3 is a block diagram illustrating the configuration of the multimedia transmitter and the multimedia receiver of the ad-hoc multimedia group communication terminal which is robust to packet loss according to the present invention. In particular, in FIG. 3, a communication operation between the transmission side terminal 1 and the reception side terminal 2 will be described based on the configuration of the multimedia transmitter 10a of the transmission side terminal 1 and the multimedia receiver 20b of the reception side terminal 2.

As shown in FIG. 3, in order to perform multimedia group communication, the multimedia transmitter 10a of the transmission side terminal includes an audio/video encoder 11, a bit stream classification and media classification/reference information provision module 12, a bit stream division and error recovery data generation module 13, a media data packet generation module 14, a media data packet transmission module 15, a control packet reception module 16, a reception status monitoring module 17, and an error recovery level/traffic adjustment module 18.

Basically, the audio/video encoder 11 generates the bit stream of media data by compressing media data using a corresponding audio/video codec.

The bit stream classification and media classification/reference information provision module 12 performs classification on the bit stream of media data generated using the audio/video encoder 11, and then provides media classification/reference information.

The media data packet generation module 14 generates media data packets in conformity of a relevant transmission format using the bit stream, in which division is performed using the bit stream division and error recovery data generation module 13.

The media data packet transmission module 15 transmits the media data packets, generated using the media data packet generation module 14, using a sub protocol.

The control packet reception module 16 receives one or more control packets, each including network QoS information relevant to the transmission and reception side terminals, from the respective reception side terminals 2a, 2b, 2c, and 2d.

The reception status monitoring module 17 recognizes packet reception status information relevant to each of the reception side terminals 2a, 2b, 2c, and 2d, included in a specific group, for each communication group based on each of the control packets received using the control packet reception module 16. Further, the reception status monitoring module 17 may be aware of group communication network status between the current transmission and reception side terminals based on the network QoS information included in each of the control packets.

When it is recognized that a large amount of packet loss occurred using the reception status monitoring module 17, the error recovery level/traffic adjustment module 18 elevates the error recovery level of media data having a high priority (for example, in the order of audio data, the I-frame, the P-frame and the B-frame of video). Further, the error recovery level/traffic adjustment module 18 reduces the entire amount of traffic by lowering the QoS (for example, resolution and the number of frames) of the media data in order to reduce the amount of media data traffic by as much as the amount of error recovery traffic which is added when the error recovery level is elevated.

As described above, the error recovery level/traffic adjustment module 18 adjusts an error recovery level and the amount of traffic based on the group communication network status recognized using the reception status monitoring module 17.

Meanwhile, the audio/video encoder 11 generates the encoding bit stream of media data based on the QoS information about the media data determined using the error recovery level/traffic adjustment module 18.

Further, the bit stream division and error recovery data generation module 13 generates error recovery data which is appropriate for the error recovery level in such a way as to perform division on the bit stream encoded based on the error recovery level information determined using the error recovery level/traffic adjustment module 18. The operation of generating error recovery data using the bit stream division and error recovery data generation module 13 will be described in detail with reference to embodiments shown in FIGS. 4 and 5.

The media data packet generation module 14 and the media data packet transmission module 15 generate media data packets generated using the audio/video encoder 11 and error recovery data packets generated using the bit stream division and error recovery data generation module 13, and then transmit them to the sub protocol.

Meanwhile, in order to perform multimedia group communication, the multimedia receiver 20b of each of the reception side terminals 2a, 2b, 2c, and 2d includes an audio/video decoder 21, a bit stream reconstruction and error recovery module 22, a packet sequence and loss check module 23, a media data packet reception module 24, a control packet generation module 25, and a control packet transmission module 26.

First, the media data packet reception module 24 receives the media data packets and error recovery data packets, transmitted from the multimedia transmitter 10a of the transmission side terminal 1, using the sub protocol.

When the packet sequence and loss check module 23 receives the media data packets using the media data packet reception module 24, the packet sequence and loss check module 23 performs the operation of checking whether all the media data packets were received in regular order from the multimedia transmitter 10a of the transmission side terminal 1.

Here, the packet sequence and loss check module 23 may check a packet loss rate generated on a transmission path based on the results of the performed operation.

Here, if one or more lost packets exist among the received media data packets, the bit stream reconstruction and error recovery module 22 recovers the lost media data packets using one or more error recovery data packets and reconstructs the bit stream. An operation of recovering the lost packets using the bit stream reconstruction and error recovery module 22 will be described in detail with reference to the embodiments shown in FIGS. 4 and 5.

The audio/video decoder 21 recovers the compressed media data bit stream reconstructed using the bit stream reconstruction and error recovery module 22 using a relevant audio/video codec.

Meanwhile, the control packet generation module 25 generates one or more control packets, including network QoS information relevant to transmission and reception side terminals, based on the packet loss rate detected by the packet sequence and loss check module 23. Here, the control packet generation module 25 generates a minimum number of control packets in order to prevent the control packets from generating the traffic load.

The control packet transmission module 26 transmits the control packets, generated using the control packet generation module 25, to the transmission side terminal 1 as feedback. Therefore, the transmission side terminal 1 may be aware of the approximate current group communication network status between the transmission and reception side terminals based on the network QoS information included in the control packets transmitted using the control packet transmission module 26.

Therefore, the ad-hoc multimedia group communication terminal which is robust to packet loss according to the present invention may recognize the approximate communication network status of the transmission and reception side terminals, included in a specific group, based on the control information as the feedback, and may apply an error recovery method adaptive to the communication network status and may adjust the amount of traffic generated due to the error recovery method. Only minimum number of control packets should be generated in such a process so that the control packets do not generate a traffic load.

Figure 4:
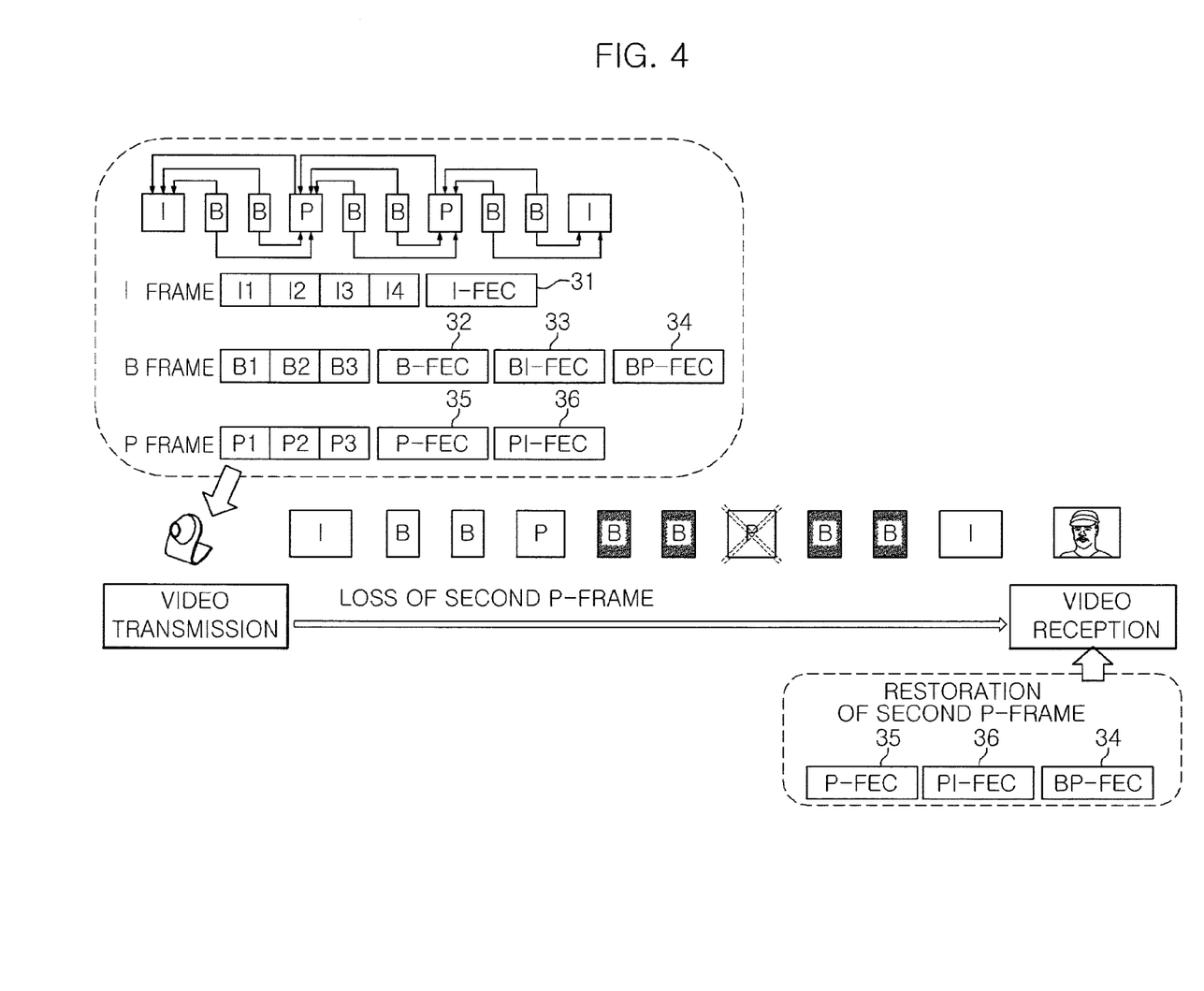
FIG. 4 is a view illustrating an error recovery operation performed using a multimedia group communication terminal according to a first embodiment of the present invention.

FIG. 4 is a view illustrating an example of an error recovery operation performed using an ad-hoc multimedia group communication terminal which is robust to packet loss according to the present invention. Here, FIG. 4 illustrates an error recovery operation which is dependent on image data characteristics based on information about the mutual reference relationship between video compression frames.

With regard to H.264 which is an image compression codec, the audio/video encoder 11 may use different types of frames, such as an I-frame, a P-frame and a B-frame.

Here, the I-frame, that is, the intra frame, is an independent type frame which can be independently decoded without referring to other images. The I-frame is always located as a first frame in a video sequence row and consumes a considerable number of bits.

The P-frame means predication between frames, and is encoded with reference to a previous I-frame or P-frame. Although the P-frame generally requires a smaller number of bits than the I-frame, the P-frame has complex dependence on the previous P-frame and I-frame, so that the P-frame is very sensitive to transmission errors.

The B-frame, that is, the bi-predictive inter frame, is a frame which refers to both a previous reference frame and a forward frame.

Therefore, when the audio/video decoder 21 decodes a bit stream for each frame and recovers video, the audio/video decoder 21 should always start the decoding with the I-frame. When the P-frame and the B-frame are used, they should be decoded together with one or more reference frames.

As described above, video data has a mutual referential relationship for each frame. Therefore, even when video data is normally received, there is a case in which the received video data is useless due to reference frame data loss.

Therefore, in order to reduce continuous loss attributable to mutual reference between video data, the embodiment illustrated in FIG. 4 provides a method of additionally generating error recovery data based on the frame reference information, and recovering one or more reference frames using the additionally generated error recovery data even when one or more reference frames are lost.

As shown in FIG. 4, the bit stream division and error recovery data generation module 13 first generates the error recovery data I-FEC 31, P-FEC 35, and B-FEC 32 which are included in the media packet data and generated for respective video frames. Thereafter, the bit stream division and error recovery data generation module 13 generates the mutually-related error recovery data PI-FEC 36, BI-FEC 33, and BP-FEC 34 for the frames, that is, a P-frame and a B-frame, which requires one or more reference frames.

As described above, the bit stream division and error recovery data generation module 13 generates error recovery data which is dependent on video data characteristics and transmits the error recovery data to each of the reception side terminals 2a, 2b, 2c, and 2d. Therefore, even when the reference frame data is lost in the reception side terminal 2a, 2b, 2c, or 2d, various opportunities, in which reference frame data can be recovered using the received error recovery data, are provided, thereby reducing continuous data loss attributable to the reference frame data loss.

Figure 5:
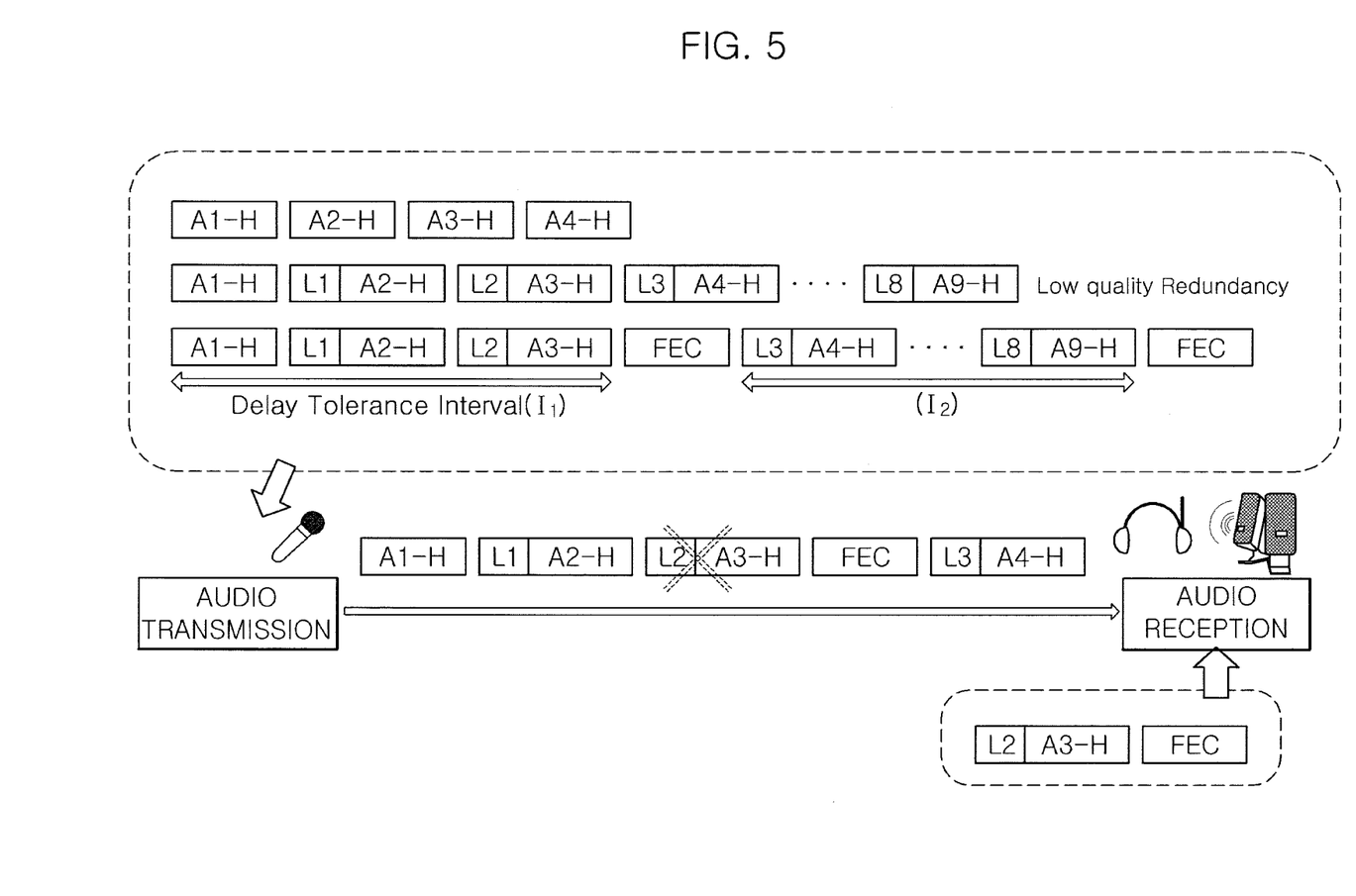
FIG. 5 is a view illustrating an error recovery operation performed using a multimedia group communication terminal according to a second embodiment of the present invention.

FIG. 5 is a view illustrating an example of an error recovery operation performed using an ad-hoc multimedia group communication terminal which is robust to packet loss according to a second embodiment of the present invention. Here, FIG. 5 illustrates an error recovery operation which is dependent on sound data characteristics sensitive to transmission delay.

When continuous packet loss is generated due to the channel error of a wireless network, there may be deterioration of media data quality in a high layer application service stage due to the critical errors of media data transmission. In the case of audio data, the audio data has characteristics sensitive to delay, thereby offending audio application users due to the continuous sound packet loss.

Therefore, in the case of audio data, which has characteristics sensitive to delay, the embodiment of FIG. 5 provides a sound data-dependent error recovery method capable of recovering continuous packet loss while minimizing the generation of delay attributable to a process of generating error recovery data.

As shown in FIG. 5, the bit stream division and error recovery data generation module 13 first generates media data packets, in which previous low-quality audio data is added in a redundant manner, thereby enabling previous packet loss to be recovered. Thereafter, the bit stream division and error recovery data generation module 13 generates error recovery data for media data packets corresponding to delay tolerance intervals $I_1$, $I_2$ such that the generation of process delay attributable to error recovery is less while continuous packet loss can be recovered.

Therefore, even when continuous packet loss is generated, the bit stream reconstruction and error recovery module 22 of each of the reception side terminals 2a, 2b, 2c, and 2d may have a lot of opportunities to recover lost packets using the media data packets, in which previous low-quality audio data is added in a redundant manner, and using the error recovery data packets for the media data packets corresponding to the delay tolerance interval $I_1$, $I_2$.

According to the present invention, an error recovery method is applied based on media data characteristics, thereby recovering continuous data loss attributable to media characteristics as well as continuous packet loss attributable to the channel errors of a wireless network.

Figure 6:
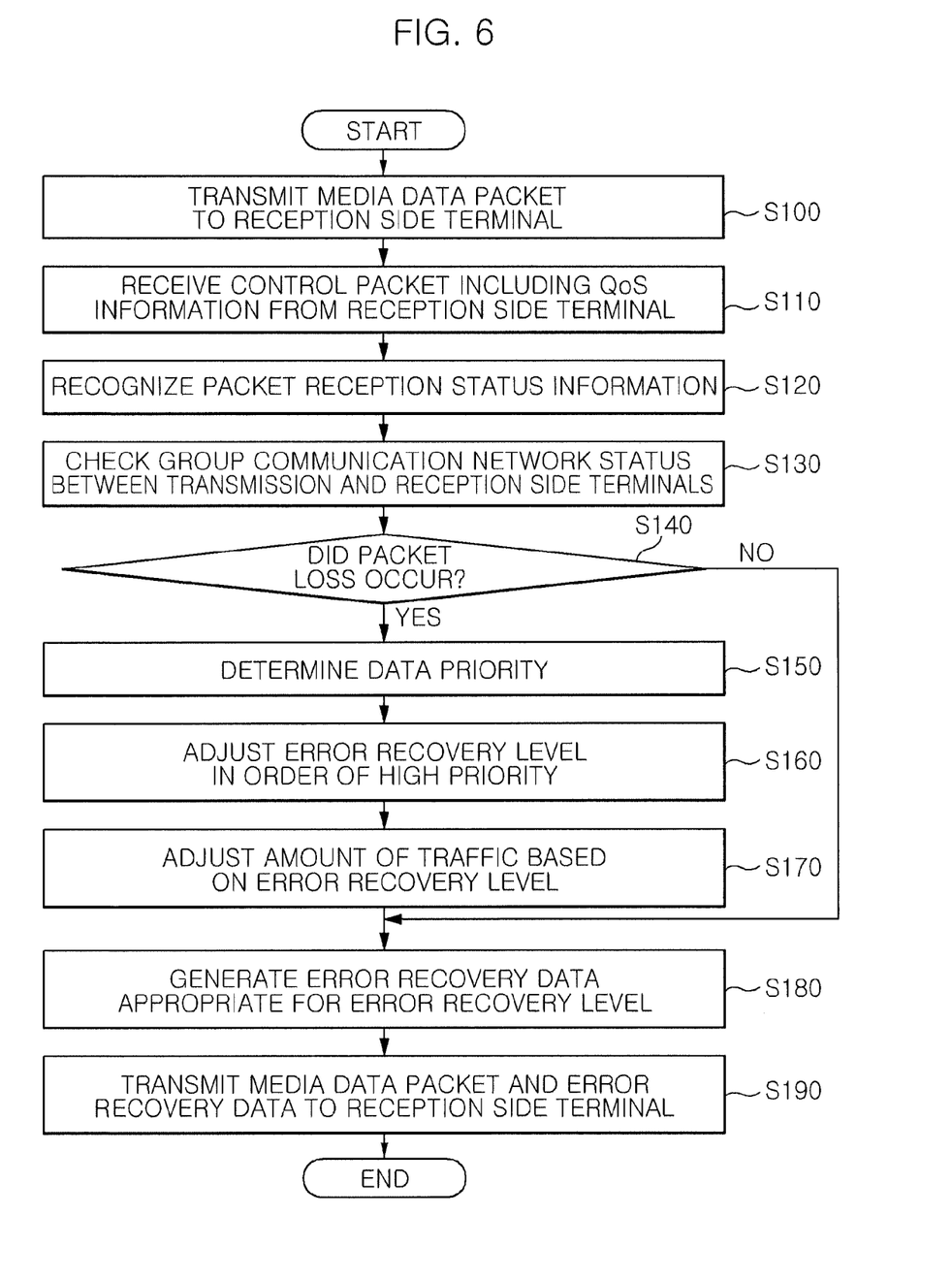
FIG. 6 is a flowchart illustrating the flow of a method of operating the multimedia transmitter of the ad-hoc multimedia group communication terminal which is robust to packet loss according to the present invention.

FIG. 6 is a flowchart illustrating the flow of a method of operating the multimedia transmitter of a transmission side terminal of the ad-hoc multimedia group communication terminal which is robust to packet loss according to the present invention.

As shown in FIG. 6, at step S100, the multimedia transmitter 10a of the transmission side terminal 1 generates the bit stream of media data by compressing the media data using a corresponding audio/video codec, generates media data packets in conformity with a transmission protocol format using the bit stream on which division is performed, and transmits the generated media data packets to each of the reception side terminals 2 using a sub protocol. Here, at step S110, the multimedia transmitter 10a receives one or more control packets, including the network QoS information relevant to transmission and reception side terminals, from the reception side terminal 2 which received the media data packets.

At step S120, the multimedia transmitter 10a recognizes packet reception status information relevant to each of the reception side terminals 2a, 2b, 2c, and 2d, included in a relevant group, for each communication group, based on the control packets received at step S110. At step S130, the multimedia transmitter 10a checks group communication network status between the current transmission and reception side terminals based on the network QoS information included in each of the control packets.

At step S140, if it is determined that a large amount of packet loss is generated at steps S120 and S130, the multimedia transmitter 10a determines data priority at step S150, and adjusts the error recovery level of media data having a high priority at step S160. For example, the multimedia transmitter 10a determines priority in the order of audio data, a video I-frame, a P-frame, and a B-frame, and elevates the error recovery level of media data having a high priority.

Further, at step S170, the multimedia transmitter 10a adjusts the amount of traffic based on the error recovery level that was adjusted at step S160. For example, the multimedia transmitter 10a reduces the entire amount of traffic in such a way as to reduce the QoS (for example, resolution and the number of frames) of the media data in order to reduce the amount of media data traffic by as much as the amount of error recovery traffic added when the error recovery level of audio data is elevated.

Here, the multimedia transmitter 10a generates the encoding bit stream of the determined media data based on the QoS information relevant to the media data. Further, at step S180, the multimedia transmitter 10a generates error recovery data which is appropriate for the error recovery level by performing division on the encoding bit stream based on information about the error recovery level that was adjusted in the process at steps S160 and S170.

Thereafter, at step S190, the multimedia transmitter 10a transmits the error recovery data, generated at step S180, and the media data packets to the corresponding reception side terminals 2 using the sub protocol.

Figure 7:
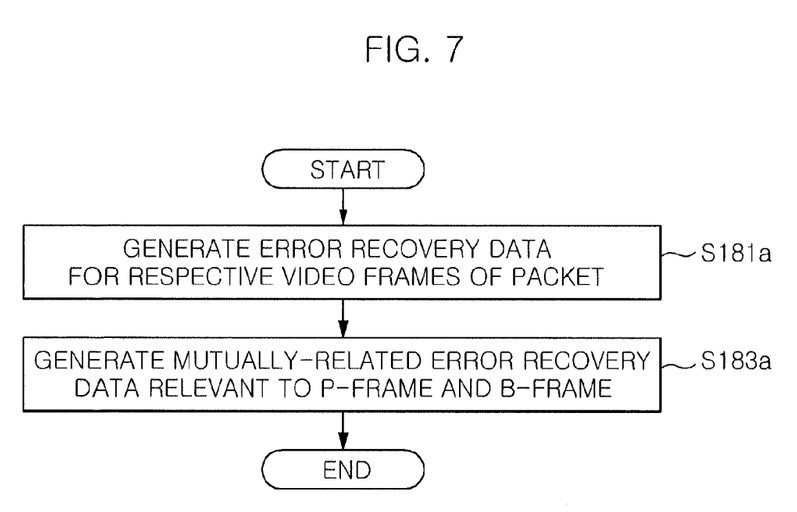
FIG. 7 is a flowchart illustrating the flow of the operations of a process of generating error recovery data shown in FIG. 6 according to the first embodiment.

FIG. 7 is a flowchart illustrating the flow of the operations of the process of generating error recovery data shown in FIG. 6 according to a first embodiment. In particular, FIG. 7 illustrates an operation of generating error recovery data, which is dependent on image data characteristics, using information about the mutual referential relationship between video compression frames.

As shown in FIG. 7, at step S181a, the multimedia transmitter 10a of the transmission side terminal 1 generates the error recovery data (I-FEC, B-FEC, and P-FEC) which are included in the media packets and generated for the respective video frames (the I-frame, the B-frame, and the P-frame) at step S180 of FIG. 6.

Thereafter, at step S183a, the multimedia transmitter 10a generates mutually-related error recovery data relevant to the B-frame and the P-frame, which require a reference frame, from among the I-frame, the B-frame, and the P-frame. In other words, the multimedia transmitter 10a generates BI-FEC and BP-FEC which are the mutually-related error recovery data relevant to B-FEC generated at step S181a. Further, the multimedia transmitter 10a generates PI-FEC which is mutually-related error recovery data relevant to P-FEC generated at step S181a.

Here, the multimedia receiver 20b can recover one or more lost packets using the error recovery data generated at step S183a even when the reference frame data is lost, and can reduce continuous data loss attributable to reference frame data loss.

Figure 8:
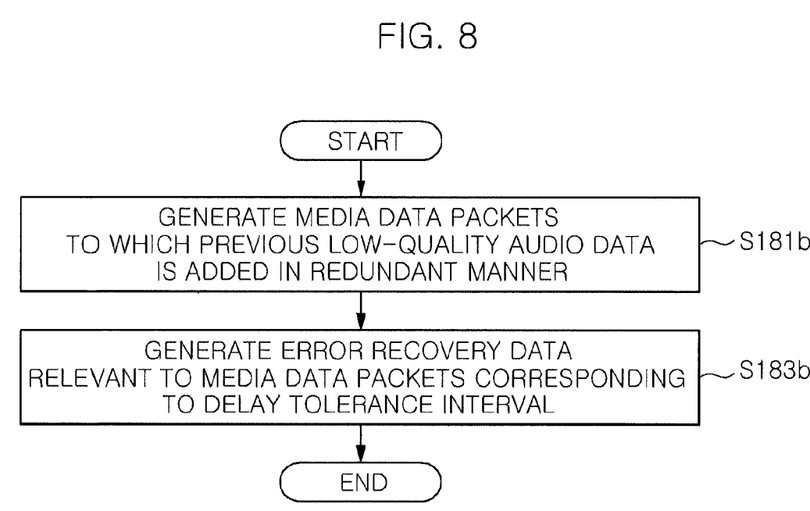
FIG. 8 is a flowchart illustrating the flow of the operations of the process of generating error recovery data shown in FIG. 6 according to the second embodiment.

FIG. 8 is a flowchart illustrating the flow of the operations of the process of generating error recovery data shown in FIG. 6 according to a second embodiment. In particular, FIG. 8 illustrates operations of generating error recovery data which is dependent on sound data characteristics sensitive to transmission delay.

As shown in FIG. 8, at step S181b, the multimedia transmitter 10a generates media data packets in which previous low-quality audio data is added in a redundant manner at step S180 of FIG. 6. Here, the multimedia receiver 20b may recover one or more previously lost packets using the error recovery data generated at step S181b.

Further, the multimedia transmitter 10a generates error recovery data for each of the media packets corresponding to continuous delay tolerance intervals $I_1$ and $I_2$ at step S183b. Here, the multimedia receiver 20b may recover the lost packets using the error recovery data generated at step S183b and may minimize process delay generated due to the error recovery.

Figure 9:
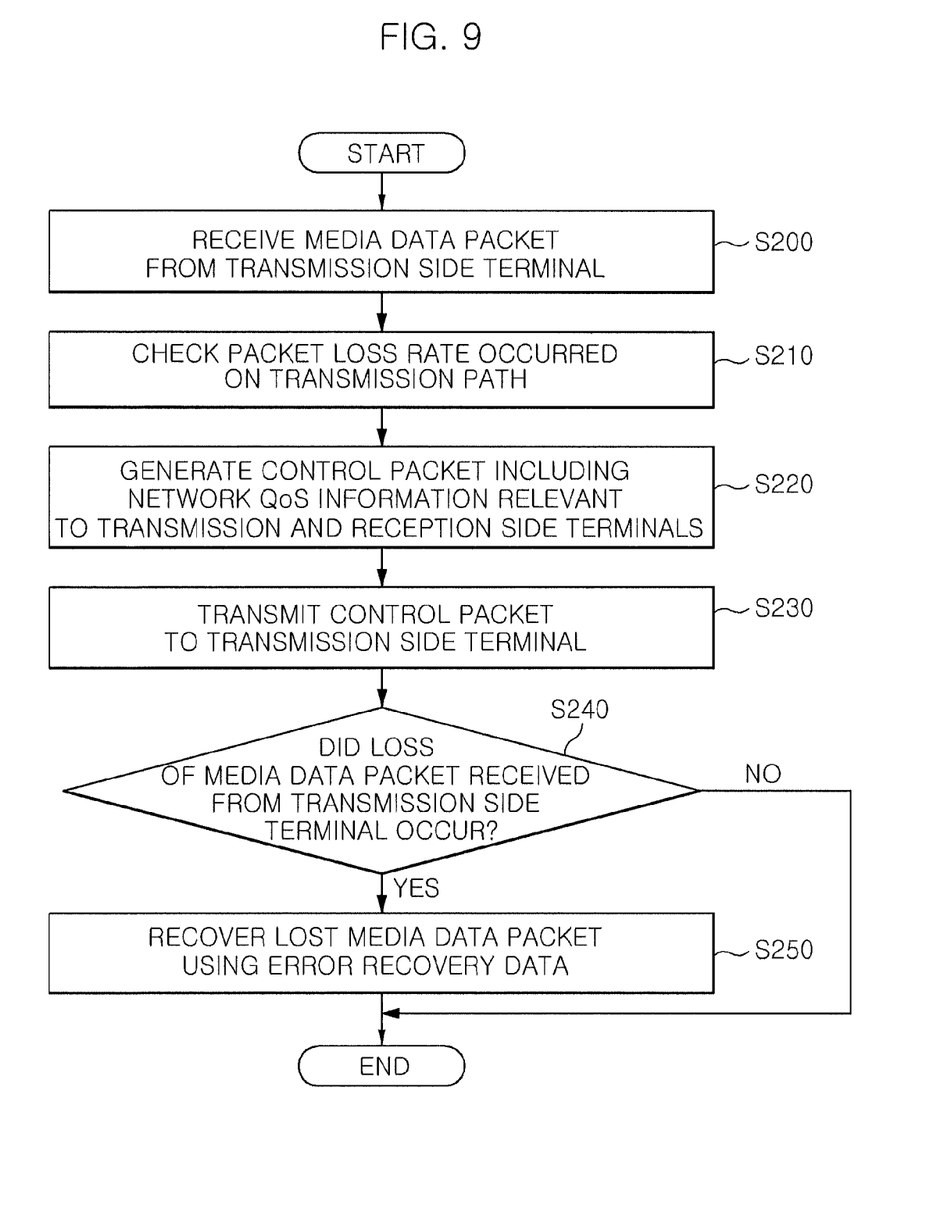
FIG. 9 is a flowchart illustrating the flow of a method of operating the multimedia receiver of the ad-hoc multimedia group communication terminal which is robust to packet loss according to the present invention.

FIG. 9 is a flowchart illustrating the flow of the operation of a method of recovering error using the multimedia receiver of the reception side terminal of the ad-hoc multimedia group communication terminal which is robust to packet loss.

As shown in FIG. 9, the multimedia receiver 20b of the reception side terminal 2 may receive one or more media data packets from the transmission side terminal 1 using a sub protocol at step S200, and may check a packet loss rate that occurred on a transmission path between transmission and reception terminals using header information included in each of the received packets at step S210.

In other words, the multimedia receiver 20b may check whether the packets, transmitted from the transmission side terminal 1, are appropriately and sequentially received using the header information included in each of the received packets, and may check if there is any lost packet among the received packets. Here, the multimedia receiver 20b may check the packet loss rate that occurred on the transmission path between the transmission and reception side terminals.

At step S220, the multimedia receiver 20b generates one or more control packets, each including the network QoS information relevant to the transmission and reception side terminals, based on the packet loss rate, which was checked at step S210. At step S230, the multimedia receiver 20b transmits the generated control packets to the transmission side terminal 1.

Meanwhile, after the multimedia receiver 20b transmits the control packets to the transmission side terminal 1 at step S230, if there was any loss of the media data packets received from the transmission side terminal 1 at step S240, the multimedia receiver 20b recovers the lost media data packets using the received error recovery data packets and reconstructs bit stream at step S250.

Here, the compressed bit stream reconstructed at step S250 is recovered using an audio/video codec.

As described above, an ad-hoc multimedia group communication terminal which is robust to packet loss and a method of operating the same according to the present invention has been described with reference to the drawings as examples. However, the present invention is not limited to the embodiments and drawings disclosed in the present specification, and may be applied to the scope in which technical sprit is protected.

According to the present invention, in order to enable real-time media transmission in a wireless network environment which generates rapid picture quality deterioration because of a large amount of packet loss and variations in transmission delay attributable to a channel fading phenomenon and channel noise, wireless channel variation is measured using control information from group communication reception terminals, and error recovery levels and the amount of media data transmission are fluidly and appropriately selected, so that there is an advantage of minimizing packet loss.

Further the present invention applies a media-dependent error recovery method in which different error recovery techniques are applied based on multimedia characteristics, so that there is an advantage of recovering continuous data loss based on the media characteristics as well as continuous packet loss attributable to the channel errors of a wireless network.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An ad-hoc multimedia group communication terminal which is robust to packet loss, the ad-hoc multimedia group communication terminal comprising a multimedia transmitter, wherein the media transmitter comprises:
   a reception status monitoring module for, when one or more media data packets are transmitted to one or more reception side terminals, recognizing packet reception status information relevant to the reception side terminals for each communication group based on one or more control packets received from each of the reception side terminals;
   an error recovery level/traffic adjustment module for, when it is determined that a large amount of packet loss occurred using the reception status monitoring module, adjusting an error recovery level and an amount of traffic of each of the media data packets transmitted to each of the reception side terminals based on the packet reception status information;
   a bit stream division and error recovery data generation module for generating error recovery data to be transmitted to each of the reception side terminals based on the error recovery level; and
   a media data packet generation module for generating the media data packets and error recovery data packets,
   wherein the error recovery level/traffic adjustment module elevates the error recovery level of each of the media data packets in an order of a higher priority.

2. The ad-hoc multimedia group communication terminal as set forth in claim 1, wherein the error recovery level/traffic adjustment module lowers the amount of traffic of each of the media data packets by as much as an amount of error recovery traffic added when the error recovery level is elevated.

3. The ad-hoc multimedia group communication terminal as set forth in claim 1, wherein the bit stream division and error recovery data generation module generates the error recovery data for respective video frames of video data in order to recover one or more lost packets of the video data.

4. The ad-hoc multimedia group communication terminal as set forth in claim 1, wherein the bit stream division and error recovery data generation module generates mutually-related error recovery data of frame data, which requires one or more reference frames, from among video frames of video data in order to recover one or more lost packets of the video data.

5. The ad-hoc multimedia group communication terminal as set forth in claim 1, wherein the bit stream division and error recovery data generation module generates the error recovery data in which previous low-quality audio data is added in a redundant manner in order to recover one or more lost packets of audio data.

6. The ad-hoc multimedia group communication terminal as set forth in claim 1, wherein the bit stream division and error recovery data generation module generates the error recovery data for audio packets corresponding to a delay tolerance interval of continuous packets in order to recover one or more lost packets of audio data.

7. The ad-hoc multimedia group communication terminal as set forth in claim 1, further comprising a media data transmission module for transmitting the media data packets and the error recovery data packets to each of the reception side terminals using a sub protocol.

8. A method of operating an ad-hoc multimedia group communication terminal, the ad-hoc multimedia group communication terminal being robust to packet loss and comprising a multimedia transmitter, the multimedia transmitter performing the following:
   when one or more media data packets are transmitted to one or more reception side terminals, recognizing packet reception status information relevant to the reception side terminals for each communication group based on one or more control packets received from each of the reception side terminals;
   when it is determined that a large amount of packet loss occurred in the recognizing the packet reception status information, adjusting an error recovery level and an amount of traffic of each of the media data packets transmitted to each of the reception side terminals based on the packet reception status information;
   generating error recovery data to be transmitted to each of the reception side terminals based on the error recovery level; and
   generating the media data packets and error recovery data packets and then transmitting the generated media data packets and error recovery data packets to each of the reception side terminals using a sub protocol,
   wherein the adjusting comprises elevating the error recovery level of each of the media data packets in an order of a higher priority.

9. The method as set forth in claim 8, wherein the adjusting comprises lowering the amount of traffic of each of the media data packets by as much as an amount of error recovery traffic added when the error recovery level is elevated.

10. The method as set forth in claim 8, wherein the generating the error recovery data comprises generating the error recovery data for respective video frames of video data in order to recover one or more lost packets of the video data.

11. The method as set forth in claim 8, wherein the generating the error recovery data comprises generating mutually-related error recovery data of frame data, which requires one or more reference frames, from among video frames of video data in order to recover one or more lost packets of the video data.

12. The method as set forth in claim 8, wherein the generating the error recovery data comprises generating the error recovery data in which previous low-quality audio data is added in a redundant manner in order to recover one or more lost packets of audio data.

13. The method as set forth in claim 8, wherein the generating the error recovery data comprises generating the error recovery data for audio packets corresponding to a delay tolerance interval of continuous packets in order to recover one or more lost packets of audio data.

* * * * *